June 20, 1933.  R. BARTHELEMY  1,914,842
ELECTRICAL SYNCHRONIZING DEVICE
Filed July 13, 1931

Inventor
René Barthélemy
by Wilkinson & Mawhinney
Attorneys.

Patented June 20, 1933

1,914,842

UNITED STATES PATENT OFFICE

RENÉ BARTHELEMY, OF FONTENAY-AUX-ROSES, FRANCE, ASSIGNOR TO COMPAGNIE POUR LA FABRICATION DES COMPTEURS ET MATERIEL D'USINES A GAZ, OF MONTRANGE, SEINE, FRANCE

ELECTRICAL SYNCHRONIZING DEVICE

Application filed July 13, 1931, Serial No. 550,556, and in France October 23, 1930.

The various types of synchronized motors used principally in television, telecinematography, telemechanics, etc. are generally subjected to an auxiliary motive torque the purpose of which is to balance the mechanical friction torque and other losses, a synchronizing torque which determines the speed and exact phase of rotation, and an electromagnetic braking torque which has to be very large in comparison with the mechanical friction torque so that the friction which is very variable shall not disturb the rated speed. These various torques are produced by circuit arrangements which may be separate or combined together.

A cause of irregular operation of these various systems which necessitate a particularly constant phase in the case of television, is due to the current variations of the supply sources. The electric supply circuit from which the auxiliary motive torque is generally derived, suffers under this drawback.

The present invention consists in making the electromagnetic braking torque also a function of the supply voltage, whereby almost total compensation is obtained, the phase oscillations due to fluctuations of the supply circuit being practically eliminated.

A device based on this principle has been illustrated diagrammatically by way of example in the accompanying drawing wherein.

On a spindle XX are mounted two motors M and M' supplying the auxiliary motive torque and the synchronizing torque respectively, and an electromagnetic braking system, for example, a metallic disc D (which may act concurrently as the perforated television scanning disc) on which acts the field of an electromagnet E which is energized by a winding B connected to the same source as the converter C feeding the motor M, S being the synchronizing current supply circuit which feeds the motor M'. The regulating valve R (iron filament in hydrogen) protects the system against slow variations of large amplitude. The alternating voltage supply is applied at U.

It is obvious that with this arrangement any increase in the driving torque corresponds to an increase in the braking torque and that equilibrium is easily maintained without making undue demands on the synchronizing torque. The phase remains practically unchanged.

The accuracy of compensation might be increased by means of suitable connected saturated inductances such as B' connected in series with the winding B.

Figure 1:
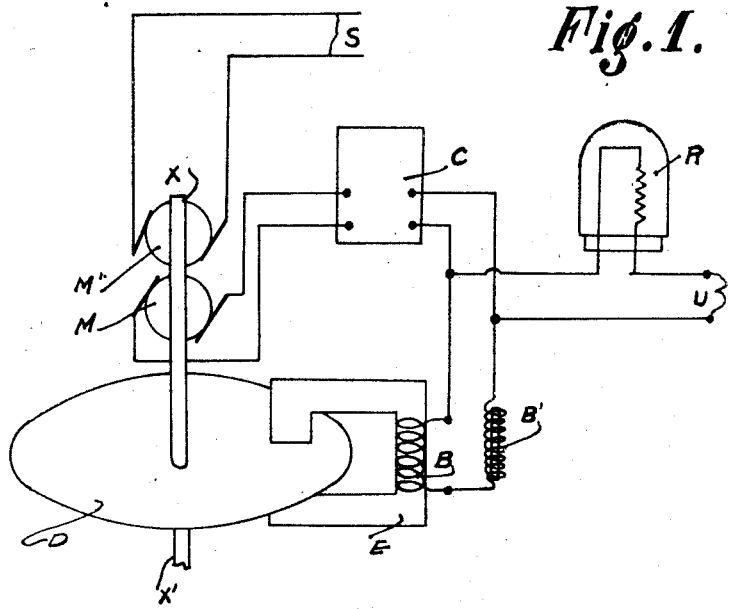
Fig. 1 illustrates a circuit arrangement according to the invention.
Figure 2:
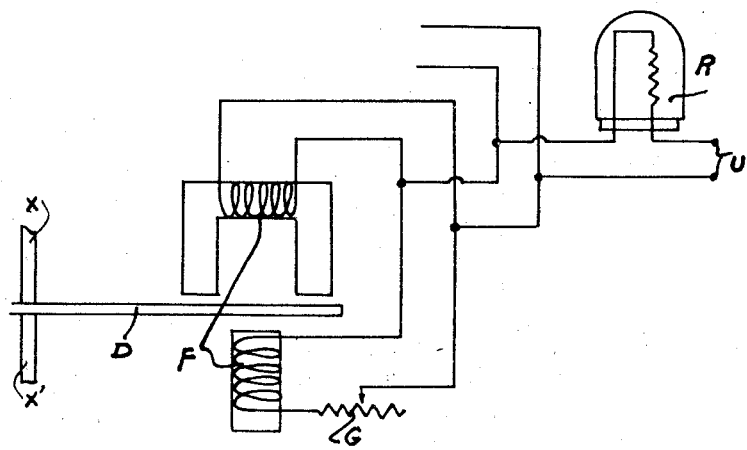
Fig. 2 illustrates a modification.

A more advantageous arrangement consists in replacing the electromagnet E by a double winding F (Fig. 2) supplying a driving torque, as obtains in the case of the induction motors of electric current meters. Said driving torque facilitates starting, but above a certain disc speed, the motive torque becomes a resistance torque. An adjustable resistance G connected in series with said double winding F enables the phase to be adjusted to the suitable value.

It is thus possible to combine the advantages of compensating the fluctuations of a current supply with those of automatic starting and easy phase adjustment, that is to say, in television, perfect centering of the image.

I claim:

1. In a synchronized electric motor device, the combination of an electric supply circuit, means fed from said electric supply circuit for applying to said electric motor device an auxiliary motive torque to balance the mechanical friction torque and other losses, an induction motor device coupled to said electric motor device, and means associated with said induction motor for providing on said electric motor device a driving torque at low speeds and a braking torque at high speeds of rotation.

2. In a synchronized electric motor device, the combination of an electric supply circuit, means fed from said electrical supply circuit for applying to said electric motor device an auxiliary motive torque to balance the mechanical friction torque and other losses, an induction motor device coupled to said electric motor device, means including a double winding associated with said induction motor for providing on said electric motor device a driving torque at low speeds and a braking torque at high speeds of rotation, and a resistance connected in series with said double winding.

RENÉ BARTHELEMY.